United States Patent Office 3,025,317
Patented Mar. 13, 1962

3,025,317
PHENYLETHYLMALONIC ACID ETHYL ESTER DIETHYLAMINOETHYLAMIDE AND SALTS THEREOF
Paolo Galimberti, Pavia, and Vittorina Gerosa and Max Marcello Melandri, Milan, Italy, assignors to Societa Italiani Prodotti Schering, Milan, Italy
No Drawing. Filed Mar. 9, 1960, Ser. No. 13,713
Claims priority, application Great Britain Mar. 26, 1959
4 Claims. (Cl. 260—471)

This invention is concerned with phenylethylmalonic acid diethylaminoethylamido ethyl ester (FEMA) of the formula:

$$\begin{array}{c} C_6H_5 \\ \diagdown \\ C_2H_5 \diagup \end{array} C \begin{array}{c} CONHCH_2CH_2N \diagup C_2H_5 \\ \diagdown C_2H_5 \\ \diagdown COOC_2H_5 \end{array}$$

The compound of the invention has been found highly effective in counteracting in vitro the isolated guinea pig ileum seizure due to $BaCl_2$. In this respect the new compound has been found 15 times as active as papaverine.

The dose effective in preventing 75 percent of $BaCl_2$ induced spasms in vivo ranges between 3 and 4 mg./kg. as compared with 10 mg./kg. for papaverine in guinea pigs.

The new compound of the invention is also very effective in prolonging barbiturate hypnosis. The results obtained in rats and mice are summarised in the following table which shows that the duration of the hypnosis due to hexobarbital is prolonged 3–7 times by the simultaneous administration of FEMA.

TABLE I
*Prolongment of the Duration of Hypnosis Due to Intrapertoneal Hexobarbital by the Simultaneous Administration of FEMA*

A. FEMALE MICE (100 MG./KG. HEXOBARBITAL)

| Dose of FEMA (mg./kg.) | Route | Number of animals | Duration of hypnosis in minutes |
|---|---|---|---|
| Controls | | 74 | 18±5.2 |
| 25 | I.p. | 15 | 143±9 |
| 25 | Oral | 15 | 133±6 |

B. MALE MICE (100 MG./KG. HEXOBARBITAL)

| Controls | | 30 | 18±3 |
|---|---|---|---|
| 25 | I.p. | 10 | 71±7 |
| 25 | Oral | 10 | 80±12 |

C. FEMALE RATS (75 MG./KG. HEXOBARBITAL)

| Controls | | 75 | 30± 5 |
|---|---|---|---|
| 25 | I.p. | 15 | 155±59 |
| 25 | Oral | 10 | 163±13 |

D. MALE RATS (75 MG./KG.)

| Controls | | 25 | 24± 6 |
|---|---|---|---|
| 25 | I.p. | 10 | 95±17 |
| 25 | Oral | 10 | 77±12 |

FEMA is also effective in improving the analgesic activity of aminopyrine in rats. The analgesic activity is enhanced by 50–70 percent.

FEMA, which is devoid of any antihistaminic activity, is nevertheless very effective in enhancing the antihistaminic activity of chlorprophenpyridamine. The following table is illustrative in this respect.

TABLE II
*Enhancement of the Antihistaminic Activity of Chlorprophenpyridamine by the Simultaneous Administration of FEMA in Guinea Pigs*

| Oral dose of FEMA mg./kg. | Oral $ED_{50}$ ($\gamma$/kg.) of chlorprophenpyridamine | Number of animals |
|---|---|---|
| Controls | 428 (810–285) | 18 |
| 10 | 41 (62–28) | 18 |

FEMA has a low order of toxicity. By oral route the $LD_{50}$ was 610 (520–705) in rats and 400 (331–486) in mice. By intraperitoneal route the $LD_{50}$ was (210–227) in rats and 245 (219–326) mg./kg. in mice.

The compound of the invention is simply prepared by a known procedure by reacting 1 mole of phenylethylmalonic acid ethylester chloride with 1 mole of N,N-diethylethylenediamine in the presence of 0.8 mole of anhydrous sodium carbonate in an inert organic solvent such as anhydrous benzene. After the spontaneous exothermic reaction has subsided, the mixture is refluxed for about 2 hours, cooled, filtered and the filtrate is evaporated to dryness. The obtained free base may then be converted, if desired, into its mineral acid addition salts such as hydrochloride or hydrobromide.

The following example is illustrative of the invention.

EXAMPLE

To a solution of 25.5 g. of phenylethylmalonic acid ethylester chloride in 100 ml. of anhydrous benzene 5.3 g. of anhydrous sodium carbonate are added followed by 11.6 g. of N,N-diethylethylenediamine in small portions. After the spontaneous heat evolution has subsided the mixture is refluxed for 2 hours until the evolution of carbon dioxide ceases. After cooling the mixture is allowed to stand for some hours, the precipitated sodium chloride is removed by filtration, the filtrate is evaporated to dryness in vacuo and the residue distilled at 182–188° under 3 mm. Hg.

The product is soluble in acetone, methanol, ethanol, ethyl acetate, benzene, chloroform, diethyl ether and in mineral acids. It is insoluble in water and alkalies.

The free base is converted into the hydrochloride and hydrobromide by bubbling hydrogen chloride or bromide into a diethyl ether solution of the base. The hydrochloride has M.P. 71–74° (dec.), the hydrobromide M.P. 74–80° (dec.).

What we claim is:
1. A compound selected from an ester of the formula

$$\begin{array}{c} C_6H_5 \\ \diagdown \\ C_2H_5 \diagup \end{array} C \begin{array}{c} CONHCH_2CH_2N \diagup C_2H_5 \\ \diagdown C_2H_5 \\ \diagdown COOC_2H_5 \end{array}$$

and its non-toxic mineral acid addition salts.
2. Phenylethylmalonic acid ethyl ester diethylaminoethylamide.
3. Phenylethylmalonic acid ethyl ester diethylaminoethylamide hydrochloride.
4. Phenylethylmalonic acid ethyl ester diethylaminoethylamide hydrobromide.

References Cited in the file of this patent

Fusco et al.: Chem. Abst., vol. 52, page 11853 (1958).
Galimberti et al.: Chem. Abst., vol. 52, page 13674 (1958).